United States Patent [19]

Enomoto

[11] 4,067,031
[45] Jan. 3, 1978

[54] DEVICE FOR LIMITING THE EXTENT OF MOVEMENT OF A MOVEABLE MEMBER IN A MOTOR OPERATED FOCUSSING DEVICE IN A CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 717,799

[22] Filed: Aug. 25, 1976

[30] Foreign Application Priority Data

Sept. 16, 1975 Japan .................................. 50-111946

[51] Int. Cl.² .............................................. G03B 3/10
[52] U.S. Cl. .................................... 354/195; 318/468; 350/255
[58] Field of Search ................ 354/25, 195, 196, 197, 354/198, 199, 200, 201; 318/470, 468, 466; 352/140; 353/76; 350/255, 187; 355/56

[56] References Cited

U.S. PATENT DOCUMENTS 2,434,680  1/1948  White et al. ........................ 318/468
3,701,309  10/1972  Thiele et al. ...................... 354/195 X
3,811,083  5/1974  Minghella ............................. 318/466
3,927,414  12/1975  Moriyama et al. .................. 354/195
3,970,370  7/1976  Kawai ............................... 354/195 X
3,972,056  7/1976  Tsuiimoto et al. ...................... 354/25

Primary Examiner—L. T. Hix
Assistant Examiner—William B. Perkey
Attorney, Agent, or Firm—Sughrue, Rothwell, Mion, Zinn and Macpeak

[57] ABSTRACT

In a camera a moveable member moves under control of a motor towards a mechanical stop member provided to accurately position the moveable member. The moveable member may have an objective focusing lens riding thereon and the stop position may correspond to the position of focusing at infinity. The motor energization circuit is connected to the moveable member and the stop member. When the moveable member contacts the stop member the electrical current flowing therebetween operates a switching mechanism to cut off current to the motor.

4 Claims, 3 Drawing Figures

DEVICE FOR LIMITING THE EXTENT OF MOVEMENT OF A MOVEABLE MEMBER IN A MOTOR OPERATED FOCUSSING DEVICE IN A CAMERA

BACKGROUND OF THE INVENTION

The invention relates to a device for limiting the extent of movement of a moveable member and is particularly suitable in the field of focusing mechanisms for cameras, and in particular is directed to a device for cutting off a motor which drives a focusing member when the focusing member arrives at a position determined by a mechanical stop member.

In many cameras, such as television cameras, movie cameras or the like it is common to provide a motor driven objective focusing lens. Such may also appear in still cameras having automatic focusing. The lens is mounted on a moveable member, such as a rack of a rack and pinion mechanism, and, a motor is energized to move the moveable member, such as, by rotating the pinion. It is also common in such devices to provide a mechanical stop member for insuring that the moveable member is accurately stopped at a precise position for infinity object focusing. However, there are disadvantages attendent to the mechanical stop member.

When the focusing lens moveable member impinges on the stop member, an excessive force is exerted on the electric motor possibly harming or causing failure of the motor. If a battery is used as the energy source, there is the additional disadvantage of unnecessary battery discharge at this time.

One method for overcoming the latter problems is to provide a clutch mechanism between the motor and the moveable member. This has been found to be unsatisfactory because even after interruption of the movement of the moveable member, the electric motor remains rotating due to the frictional load of the clutch.

Another method is to provide a limit switch which is actuated by the moveable member upon reaching the infinite focusing position to interrupt the flow of current to the motor. This, also has not been satisfactory. For one thing, it is difficult to completely accord an actuating position to the limit switch with the infinite focusing position of the objective lens. In the case where the switch is actuated before the focusing lens arrives at the stopper, defocusing results. If the switch actuating position is located slightly behind the mechanical stop position than all of the above mentioned problems, resulting from applying current to the motor after mechanical stoppage, will be incurred.

An appreciation of the criticallity in stop position can be had when it is realized that the allowable error of position of the objective focusing lens at infinite focusing is of the order of 0.01 mm. It is desirable to have a fine tuning or correcting means for adjusting the mechanical stop position so as to accurately position same. If a limit switch is used to stop the motor, the latter would have to be separately but relatively identically adjusted causing further difficulty.

SUMMARY OF THE INVENTION

It is therefore an object of the present invention to overcome the disadvantages mentioned above. This object is achieved by utilizing the moveable member and the mechanical stop member as part of the motor electrical circuit, whereby the completion of a circuit between the moveable and stop members, occuring when they come in contact with each other, results in disconnection of the motor and a motor energizing source.

DETAILED DESCRIPTION OF THE PREFERRED EMBODIMENTS

Figure 1:
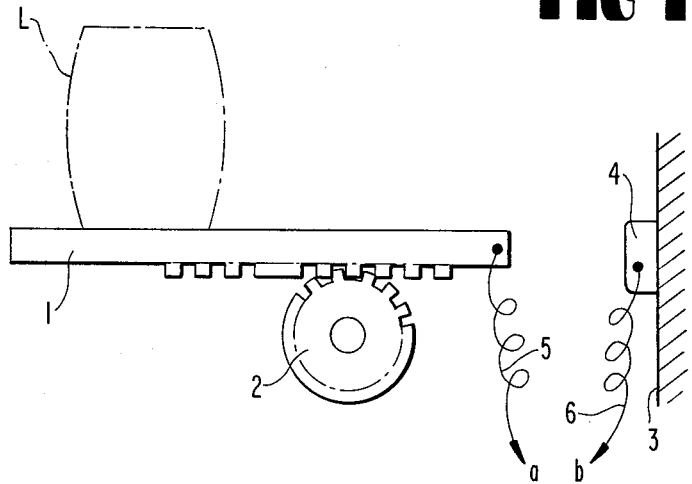
FIG. 1 is a pictorial representation of one type of moveable member and stop member mechanism.

In FIG. 1 there is shown a rack 1 having a lens L mounted thereon, a pinion 2 for moving the rack laterally upon rotation thereof in conjunction with a motor 7 (FIG. 2) or 16 (FIG. 3), a fixed member 3, such as a camera wall, and a mechanical stop member 4. The stop member is positioned so that when moveable member 1 abuts on said stop member, the lens L is at the precise position for infinite object focusing. An electrical lead 5 is connected to moveable member 1, and an electrical lead 6 is connected to the stop member 4. The ends of leads 5 and 6 are connected to points $a$ and $b$ respectively of the motor energization circuit.

Figure 2:
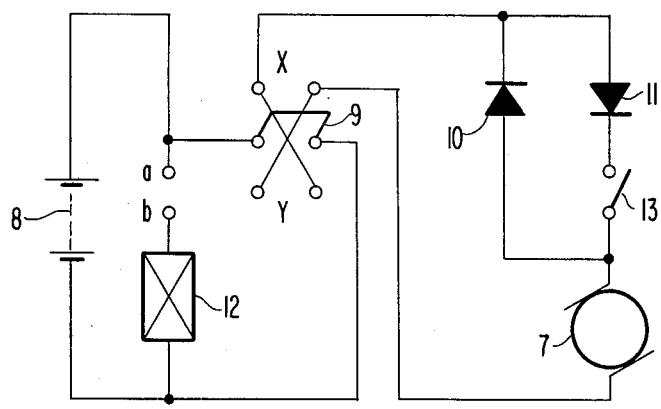
FIGS. 2 and 3 are circuit diagrams of motor energizing circuits.

One embodiment of a motor energization circuit, as shown in FIG. 2, comprises, motor 7, reverse polarity diodes 10 and 11, relay coil 12 and switch 13 responsive thereto, battery 8, and double pole double throw polarity reversing switch 9. When switch 9 is at position Y the current path includes battery 8, motor 7 and diode 10. The motor rotates to move moveable member 1 to the left. When switch 9 is at position X the current path includes battery 8, diode 11, normally closed switch 13, and motor 7. The moveable member 1 is thus moved to the right. When the moveable member contacts stop member 4 a circuit is completed between $a$ and $b$. The battery 8 therefore energizes coil 12, which opens switch 13 to interrupt the supply of current to the motor 7.

As will be appreciated the use of the members 1 and 4 as part of the circuit not only simplifies the construction but provides a perfectly accurate method for cutting off the current immediately upon the lens reaching the desired stop position, thereby protecting the motor without fear of stopping the motor too soon. Furthermore if adjustment of the infinite focusing position becomes necessary, it is only necessary to adjust the stop member position. Whatever the adjusted, position the motor will cease to be energized at exactly the correct point.

The members 1 and 4 are electrically conductive, at least from the contact point to the respective connection point of the wire lead.

Figure 3:
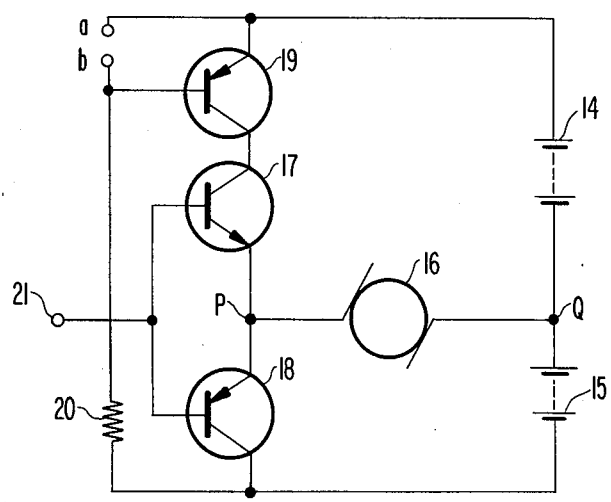

FIG. 3 shows another circuit for controlling the motor. In the circuit of FIG. 3 the direction of rotation of the motor 16 is controlled by the polarity of the voltage applied at an input terminal 21. The circuit includes a pair of batteries 14, 15 having a connection point Q, transistors 17, 18 and 19, resistor 20, and motor 16. When the input voltage is negative, transistor 17 is cut off and transistor 18 conducts. Battery 15 supplies current to motor 16 in the direction from Q to P. In this case the motor drives moveable member 1 to the left.

When the input at 21 is positive, transistor 18 is cut off and transistor 17 is biased to conduct. Also, the connection of resistor 20 biases transistor 19 to conduct. Battery 14 supplies current to motor 16 via transistors 17 and 19 in a direction from P to Q. The motor is reversed and moves moveable member 1 to the right. When moveable member 1 contacts stop member 4, the former stops. Also, terminals *a* and *b* are short circuited thereby cutting off transistor 19 and interrupting the flow of current to motor 16.

While the invention has been described above in connection with a specific example it will be readily appreciated that changes can be made without departing from the essential feature of the invention. For example the moveable member need not be a rack of a rack and pinion device. It could be any moveable member which is moved by a motor and which can be stopped by contact with a mechanical stop member.

Further, the invention is not only applicable to objective focusing lenses or, for that matter, cameras, but finds wide application in any device where a moveable member is mechanically stopped and it is beneficial to simultaneously cut the supply of current to a motor driving the moveable member. Additionally, the device shown could be easily modified to cut off the motor current at stop positions at both ends of the moveable member.

What is claimed is:

1. A control circuit for cutting the supply of current to a motor when a moveable member, continuously moveable by said motor, comes to a stop abutting relation with a stop member, comprising first and second circuit means for selectively applying current to said motor in first and second directions to cause said motor to rotate in first and second directions, respectively, to move said moveable member in first and second directions, respectively, said moveable member moving toward said stop member in said first direction, said control circuit further comprising at least the abutting portions of said moveable member and stop member, at least said portions being electrically conductive, a pair of electric lead wires electrically connected, respectively, at their first ends to the electrically conductive parts of said moveable and stop members, and switch means connected to the second ends of said pair of lead wires and responsive to completion of a circuit between said moveable and stop members for interrupting the current flow in said first circuit means.

2. A control circuit as claimed in claim 1 wherein said switch means comprises a relay coil and a normally closed switch openable in responsive to energization of said relay coil, said relay coils being connected in series with said second ends of said lead wires and said switch being connected in said first circuit in series with said motor.

3. A control circuit as claimed in claim 1 wherein said switch means comprises a first transistor having its collector and emitter terminals connected in said first circuit in series with said motor and having its emitter and base terminals connected to the second ends of said lead wires, respectively, whereby completion of said circuit including said moveable and stop members biases said transistor in a cut off condition.

4. A control circuit as claimed in claim 1 wherein said moveable member moves an objective focusing lens of a camera and said stop member is positioned relative to said moveable member to stop said moveable member at the infinity focusing point of said objective lens.

* * * * *